United States Patent [19]

Scudder

[11] 4,329,836
[45] May 18, 1982

[54] HARVESTING UNITS

[75] Inventor: Roy Scudder, Araraquara, Brazil

[73] Assignee: FMC Corporation, Chicago, Ill.

[21] Appl. No.: 202,517

[22] Filed: Oct. 31, 1980

[51] Int. Cl.³ ..................... A01D 46/00; A01D 46/06
[52] U.S. Cl. .................................... 56/330; 56/328R; 56/233
[58] Field of Search ............. 56/330, 233, 237, 328 R, 56/328 TS

[56] References Cited

U.S. PATENT DOCUMENTS

| | | | |
|---|---|---|---|
| 3,200,575 | 8/1965 | Hurst | 56/328 R |
| 3,444,674 | 5/1969 | Huff et al. | 56/295 |
| 3,451,202 | 6/1969 | Murray | 56/328 R |
| 3,494,117 | 2/1970 | Weygandt et al. | 56/330 |
| 3,531,924 | 10/1970 | Stine | 56/328 R |
| 3,606,741 | 9/1971 | Olno et al. | 56/330 |
| 3,961,468 | 6/1976 | Brown et al. | 56/237 |
| 4,000,601 | 1/1977 | Petery, Jr. | 56/328 R |
| 4,077,193 | 3/1978 | Diggs | 56/330 |

FOREIGN PATENT DOCUMENTS 1291822 10/1972 United Kingdom ................. 56/330

*Primary Examiner*—Gene Mancene
*Assistant Examiner*—John J. Wilson
*Attorney, Agent, or Firm*—L. J. Pizzanelli; R. B. Megley

[57] ABSTRACT

Disclosed is a tractor drawn device for harvesting fruits such as berries and coffee. A harvesting device is mounted on a frame structure supporting a vertically disposed tined shaker unit and a power pack, preferably a hydraulic pump driven by a diesel engine, that imparts rotation to unbalanced weights by a hydraulic motor. The towed frame mounting the shaker unit includes levelling devices for maintaining the central axis of the shaker unit substantially vertical.

1 Claim, 3 Drawing Figures

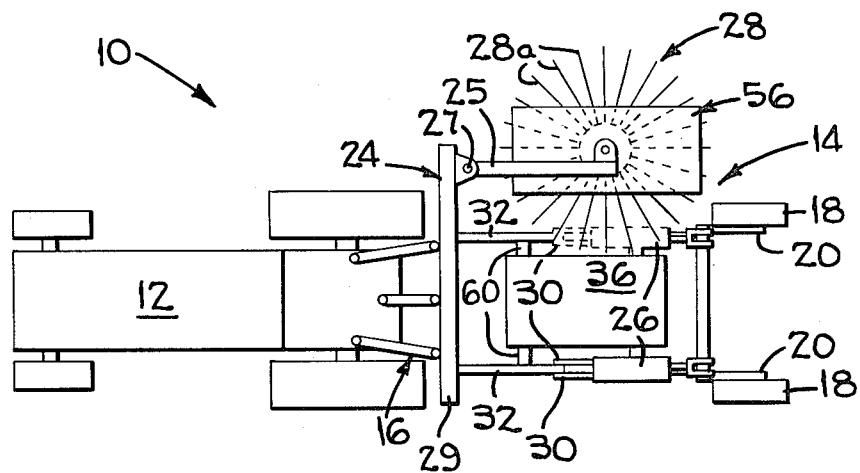
FIG_1
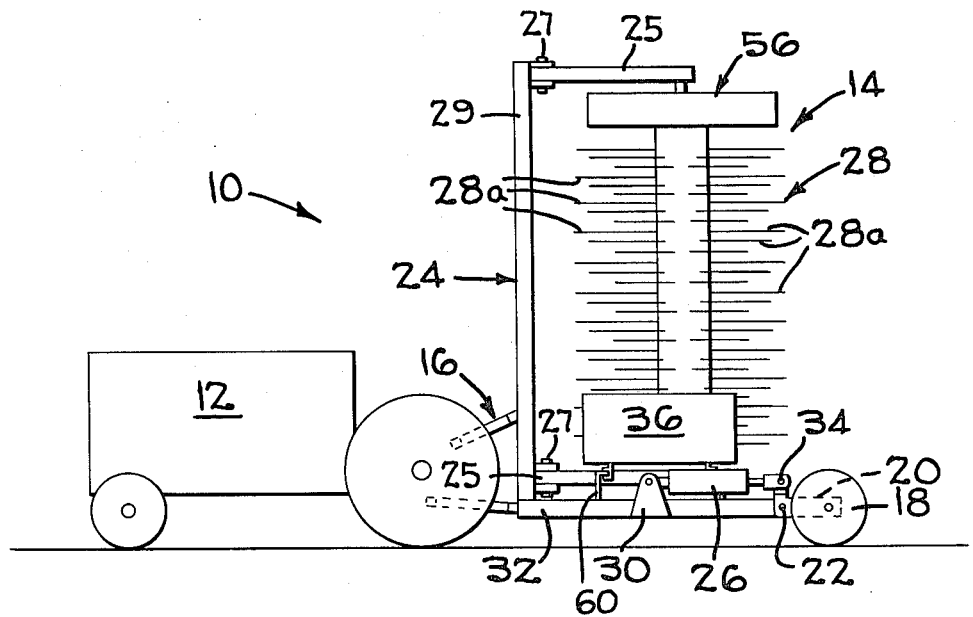
FIG_2

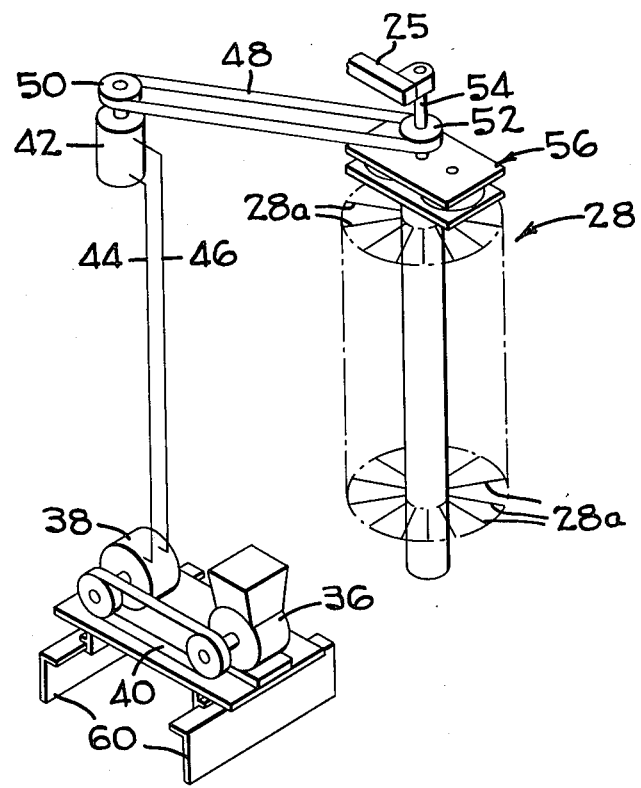

HARVESTING UNITS

FIELD OF THE INVENTION

This invention relates to harvesters and more particularly to harvesters operating to remove mature fruit from a plant or tree by oscillatory tines penetrating fruit carrying branches.

BACKGROUND OF THE INVENTION

Harvesting machines of the type disclosed herein usually comprise a frame structure mounting laterally aligned shaker units and conveying systems for accumulating the detached fruit, leaves and twigs and mechanisms to separate the trash from the fruit. The general configuration of the frame structure carrying the shaker units is generally of an inverted U shape so that the harvester can straddle a row of plants. Harvesters of this general arrangement are usually referred to as over-the-row harvesters and they include prime movers for propelling the harvester and for operating a variety of hydraulic motors to effect shaker oscillation, levelling, conveyor movement and operation of blowers generating air currents for separating trash from the fruit.

Over-the-row self propelled harvesters are economically justifiable by contract harvesters or growers having reasonably large plantations. However, there are many relatively small farms that cannot justify contract harvesting or purchase of a relatively complex and expensive harvester. Moreover, certain growing areas have a large supply of low cost labor for gathering detached fruit from the ground.

SUMMARY OF THE INVENTION

In accordance with the present invention, a single shaker unit operatively mounted on a frame structure is attachable to, and drawn by, a conventional tractor along a row of plants to detach the fruit from branches penetrated by the tines of the shaker unit.

Further, according to the present invention, the frame mounting the shaker unit includes a prime mover driving a hydraulic pump connected to a hydraulic motor to impart oscillatory motion to the shaker unit. The prime mover and the pump are located and are of sufficient mass to balance the moment created by the shaker unit which is rotatably suspended in cantilever fashion.

BRIEF DESCRIPTION OF THE DRAWINGS

FIG. 1 is a plan of the frame structure carrying the shaker unit drawn by the tractor, FIG. 2 is an elevation of FIG. 1, and FIG. 3 diagrammatically illustrates driving of the shaker unit by the prime mover and the hydraulic pump associated therewith.

DESCRIPTION OF THE PREFERRED EMBODIMENT

The tractor drawn harvesting apparatus, generally indicated by the numeral 10 includes a conventional tractor 12 and a harvesting unit 14 connected to the tractor by a three point hitch 16 which allows 3 degrees of freedom due to ground undulation and when a tractor is steered to make a right hand or left hand turn. The harvesting unit 14 includes ground engaging support wheels 18 rotatably mounted on bell cranks 20 being pivoted at 22 to the frame 24 of the harvesting unit 14.

On encountering sloping or undulating terrain, the harvester is provided with levelling devices in the form of hydraulic cylinders 26 for maintaining the axis of a tined shaking unit 28 substantially vertical. The hydraulic cylinders have one end pivotally mounted to gussets 30, which are in turn welded to frame members 32. The other end is pivotally connected at 34 to the bell cranks 20. Operation of the hydraulic cylinders, individually or in unison, may be under the control of the operator or may be operatively connected to a conventional levelling unit (preferably of the pendulum type. As will be apparent, extension of the hydraulic cylinders effects rotation of the bell cranks 20 about the pivots 22 and accordingly, lifting of the harvesting unit 14 is effected. It should also be readily apprent that when a slope is being traversed one or the other of the hydraulic unit is extended in order to maintain the axis of the shaker unit 28 vertical, or substantially vertical and thus assure proper engagement of the plant or bush.

By means of cantilevered beams 25, being pivotally connected at 27 to the vertical wall 29 of the frame 24, the shaker unit 28 is laterally adjustable to insure full penetration with the plant or bush. Any suitable means, such as hydraulic cylinders under the control of the operator, may be provided to effect outward or inward movement of the shaker unit 28.

A prime mover, preferably a diesel engine 36 is supported on the frame 24 and its placement contributes to stabilization of the harvesting unit 14. As shown in FIG. 1, the tine shaking unit 28 is located a substantial distance from the center of gravity of the harvesting unit 14. This relationship causes a substantial moment tending to twist the frame 24 and concurrently establish a force tending to tilt the harvesting unit. Thus, according to the present invention, the presence and location of the power unit tends to counterbalance these forces and locate the resultant center of gravity between the wheels 18.

With reference to FIG. 3, illustrating certain details of construction of the power unit, it will be observed that the diesel engine 36 drives a pump 38 by means of a chain 40. If desired, the output of a diesel engine can be directly coupled to the pump 38 thereby avoiding the necessity of the chain 40. The pump 38 is connected to a hydraulic motor 42 by input and return lines 44 and 46, respectively. The hydraulic motor, by means of a tooth timing belt 48, extending between motor pulley 50 and a pulley 52 secured to a shaft 54, drives an unbalanced weight unit 56, details of which are shown and described in U.S. application, Ser. No. 090,815, filed on Nov. 2, 1972, U.S. Pat. No. 4,283,906, Aug. 18, 1981 and assigned to the assignee of the present invention. By reference thereto it is intended that its disclosure be incorporated herein. Basically, the unit 56 comprises a pair of opposed shafts mounting unbalanced weights which are phased to impart rapid oscillatory motion to the shaker unit 28 which serves to loosen or detach fruit from the trees or bushes penetrated by the radially extending tines 28a.

If desired, the power unit 36 may be mounted for lateral movement in order to maintain stability in response to the extent at which the shaker unit is moved outwardly relative to the longitudinal axis of symmetry of the frame structure 24 or in response to side hill slopes having an inclination greater than the level adjustment range achieved by the hydraulic cylinders 26. To fulfill this objective, the power unit 36 may be mounted on laterally extending guide ways 60 supported by and extending between frame members 32. If desired, lateral movement of the power unit 36 may be integrated to respond to adjustments in the elevation of one or both wheels 18 or may be independently controlled by the operator.

Accordingly, the structure and mode of operation of the above-described invention provides an economical harvesting unit having very stable characteristics and being manually or automatically adjustable to accommodate itself to undulating or sloping land contours.

The diesel engine found suitable for the harvesting unit is a single cylinder diesel engine manufactured by Ruggerini, Model RD-900, having an output of 10 hp at 2300 rpm. A suitable pump is manufactured by Bosch GmbH having a volumetric output of 8 gallons per minute and is adapted to be coupled to the case of the diesel engine.

Although the best mode contemplated for carrying out the present invention has been herein shown and described, it will be apparent that modification and variation may be made without departing from what is regarded to be the subject matter of the invention as defined in the appended claims.

What I claim is:

1. A tractor drawn harvester including a tined shaker unit that rapidly strikes fruit bearing branches of trees or bushes to dislodge fruit, the shaker unit being operatively mounted on a frame structure having a generally horizontal portion and vertical portion mounting the shaker unit for movement transverse to a row of trees being harvested, the frame structure having a hitch at its forward end connectable to a tractor and a pair of wheels at its trailing end, the improvement in said frame structure comprising a platform mounting a power unit providing pressure fluid for operating the shaker unit, said platform being mounted on the frame structure and being displaceable transversely relative to a row of trees, selectively operable means for moving the shaker unit toward the row of trees so that the tines achieve the desired penetration, and means for displacing said power unit transversely in a direction opposite to the direction in which the shaker unit is moved to thereby maintain the resultant center of gravity between the wheels.

* * * * *